B. L. BAILEY.
CHAIN SAW.
APPLICATION FILED JAN. 4, 1911.
1,016,664.
Patented Feb. 6, 1912.
2 SHEETS—SHEET 2.
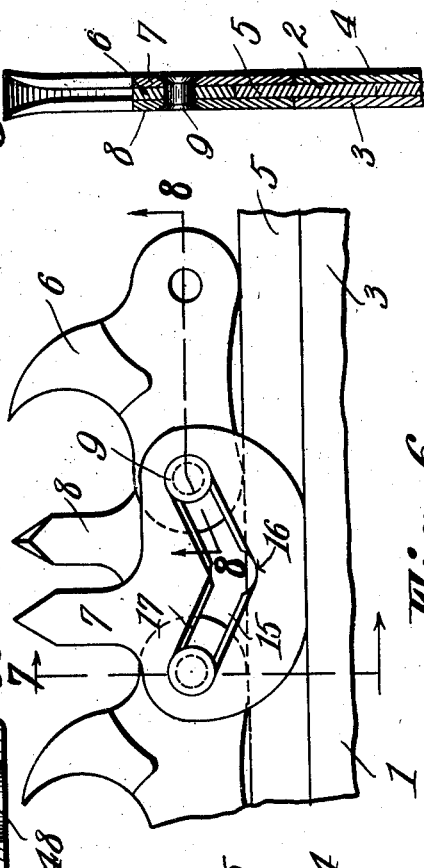
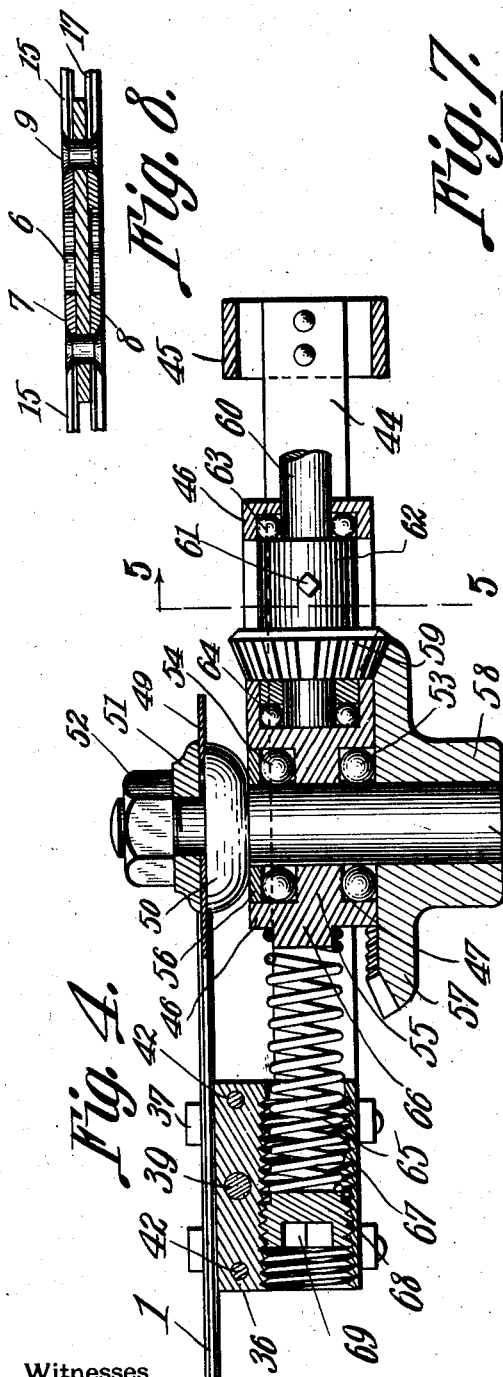
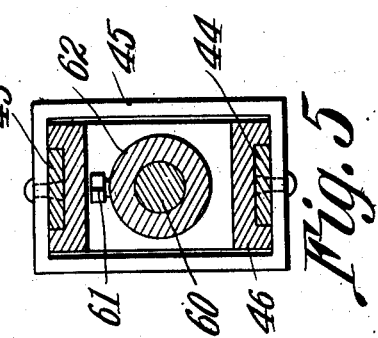
Berton L. Bailey
Inventor,
by C. A. Snow & Co.
Attorneys
Witnesses

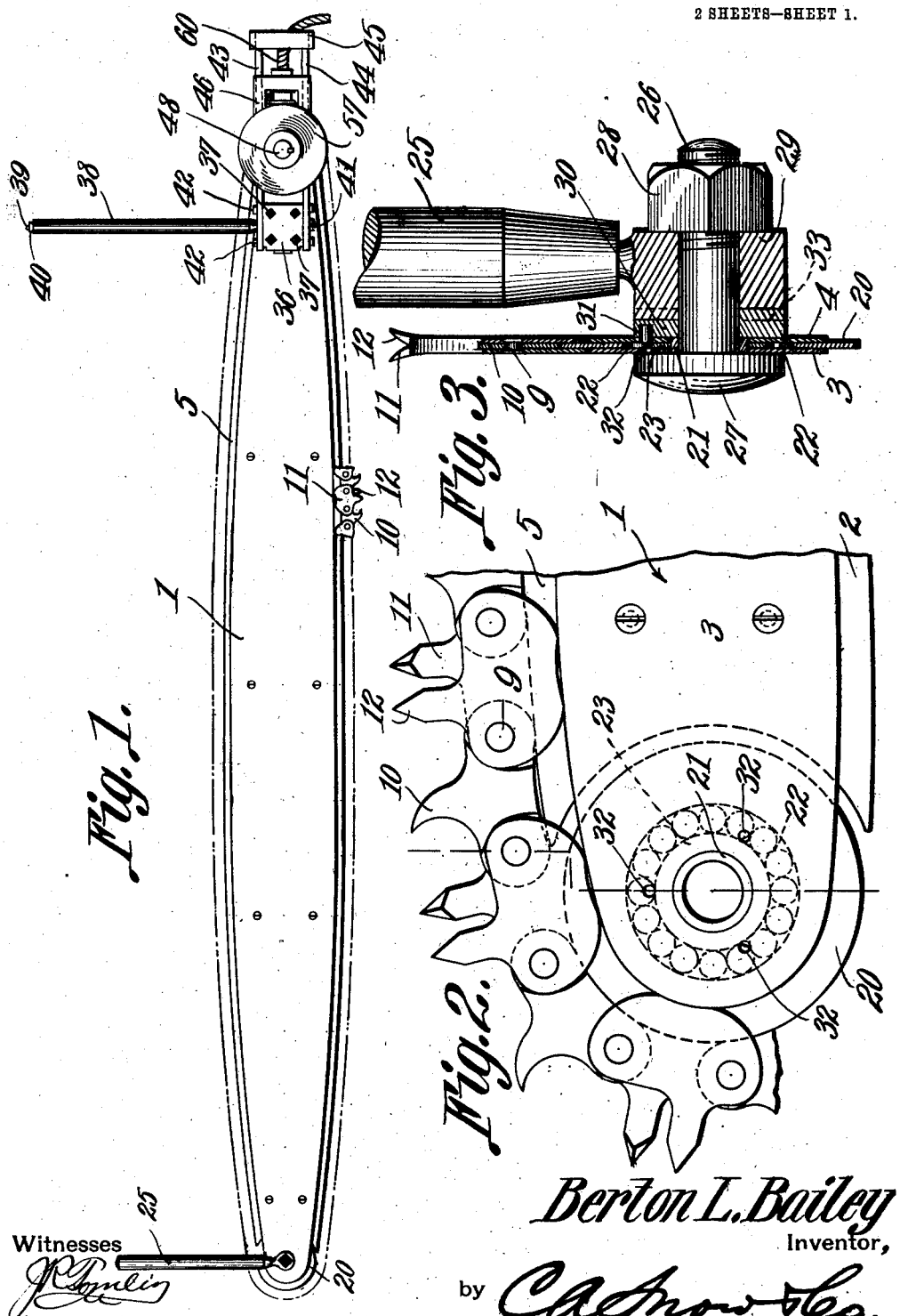

UNITED STATES PATENT OFFICE.

BERTON L. BAILEY, OF PORTLAND, OREGON.

CHAIN SAW.

1,016,664. Specification of Letters Patent. Patented Feb. 6, 1912.

Application filed January 4, 1911. Serial No. 600,759.

*To all whom it may concern:*

Be it known that I, BERTON L. BAILEY, a citizen of the United States, residing at Portland, in the county of Multnomah and State of Oregon, have invented a new and useful Chain Saw, of which the following is a specification.

This invention relates to chain saws.

One of the objects of the invention is to provide a chain saw having the chain thereof so arranged that its entire cutting edge is unobstructed, so that said chain can be detached by merely moving the sprocket bearings thereof toward each other, it being unnecessary to unscrew any plates or to detach any parts of the saw.

A further object of the invention is to provide a chain saw, the active edges of which are convex or curved outwardly.

A further object of the invention is to provide a chain saw with end handles for supporting the same in the manner of an ordinary cross-cut saw, one of said handles being adjustable to any desired position.

A further object of the invention is to provide a novel and useful form of teeth for the saw.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawings forming part of this specification:—Figure 1 is a side elevation of chain saw constructed in accordance with the invention. Fig. 2 is an enlarged detail view showing the idler end of the saw. Fig. 3 is a detail view partly in section and partly broken away showing the adjustable saw handle at the idle end of the saw. Fig. 4 is a horizontal section showing in detail the mechanism at the operating end of the saw. Fig. 5 is a vertical section on the line 5—5 of Fig. 4. Fig. 6 is an enlarged elevation showing in detail the form of the saw teeth. Fig. 7 is a section on the line 7—7 of Fig. 6. Fig. 8 is a section on the line 8—8 of Fig. 6.

Like reference numerals indicate corresponding parts in the different figures of the drawings.

The saw of the present invention is constructed with a blade 1, the active edges of which, as shown at the upper and lower ends of Fig. 1, are curved or convexed, whereby to provide a saw blade which is relatively broad at its central portion and narrow at its ends. The saw blade 1, as best shown in Fig. 7 of the drawing, is made up of a center plate 2 and a pair of outer plates 3 and 4, the center plate 2 being of larger dimensions than the outer plates 3 and 4 so as, in effect, to produce a rib or extension 5 which serves as a track for the saw chain to engage.

The saw chain preferably although not essentially consists of inner or raker teeth members 6 and outer or cutter teeth members 7 and 8, said members 6, 7 and 8 being preferably connected with each other by means such as the double ended rivets 9 fixed on the inner or raker teeth members 6 and detachably engaging the outer or cutter teeth members 7 and 8, as will more fully hereinafter appear. The inner members 6 of the chain preferably engage and run along the rib extension 5 of the inner plate 2 of the saw blade, and the outer or cutter teeth members 7 and 8 preferably embrace opposite sides of the rib extensions 5 and also fit against the outer edges of the outer plates 3 and 4 of the saw blade. The saw chain is thus held securely in position upon the saw blade and guided properly in its longitudinal movement thereon.

In Fig. 2 of the drawing, the raker teeth are indicated by the reference numerals 10 and the different pairs of cutter teeth are indicated by the numerals 11 and 12 respectively, the teeth of each pair of cutter teeth being arranged out of line with each other. That is to say one of the cutter teeth of each pair 11 and 12 is arranged slightly in advance of the other tooth of the same pair. The center portion of each raker tooth member 6 is suitably thickened so as to be of the same thickness as the thickest part of the chain. That is to say, the outside faces of the center portion of each raker tooth member 6 are in the same planes with the outside faces of the adjacent cutter tooth members 7 and 8. For this reason, the chain is of uniform thickness from end to end.

The modified construction of chain saw illustrated in Fig. 6 of the drawing is the same as that shown in Fig. 2 except that each of the cutter tooth members 7 and 8 is formed with an approximately V-shaped slot 15 which is formed with an enlarged portion 16 at the apex thereof. The enlarged portion 16 is of the proper size to receive the enlarged head 9 of the rivet which secures the cutter tooth member to the raker tooth member. In assembling the parts of the chain, the two rivets 9 are fitted successively through the enlarged portion 16 and then drawn into the end of the slot. The edges of the V-shaped slot 15 are beveled as indicated at 17 so as to engage the under-cut beveled portions of the rivets 9.

The form of chain illustrated in Fig. 6 is adapted to be easily and quickly taken apart for the purpose of supplying new links whenever any of the teeth thereof become bent, broken or dull.

At the idle end of the saw, shown at the left hand of Fig. 1, the outer plates 3 and 4 are extended beyond the intermediate plate 2 in order to form bearings for a supporting wheel indicated by the numeral 20 in Fig. 3. Extending through the end extensions of the plates 3 and 4 is a steel tube or bushing 21 which is riveted or otherwise secured firmly in position. Surrounding the tube 21 is a circular series of anti-friction disks or rollers 22 which engage the inner circumference of the supporting wheel 20 and serve as an anti-friction bearing therefor. Interposed between the tube 21 and the series of anti-friction rollers 22 is a roller ring 23.

The reference numeral 25 indicates a saw handle which can be adjusted to any desired angle with respect to the saw blade and can be detached therefrom and fitted against the opposite side of the saw blade if desired. The means for securing the handle 25 in position preferably includes a bolt 26 which extends through the bushing 21 and is provided with an enlarged head 27 at one end and a detachable nut 28 at the other end. The bolt 26 extends through a ring or bushing 29 secured to the inner end of the handle 25. Surrounding the bolt 26 between the ring 29 and the saw blade is a washer 30 which is provided with a plurality of pins 31, preferably three in number. The pins 31 are adapted to fit into openings or perforations 32 shown best in Fig. 2, three of said openings 32 being arranged on each side of the saw blade so that the washer 30 can be arranged on either side or can be transferred from one side to the other. The pins 31 engaging the openings 32 serve to prevent the washer 30 from rotating with respect to the saw blade. The outer face of the washer 30 is provided with a circular series of teeth or serrations as indicated by the dotted lines at 33 in Fig. 3 and the inner face of the ring 29 of the handle 25 is similarly provided with a circular series of teeth or serrations to engage the teeth on the washer 30. By loosening the nut 28 and disengaging the teeth on the member 29 from the teeth on the washer 30, the handle can be rotated upon the bolt 26 to any desired position and by then tightening the nut 28, the teeth on the handle will be engaged with the teeth on the washer 30, whereby to lock the handle in adjusted position. By entirely removing the nut 28 and bolt 26, the parts can be reversed and placed on the opposite side of the saw blade if desired.

The operating and tension mechanism will now be described with particular reference to Figs. 1, 4, and 5. The reference numeral 36 indicates a block which is adapted to be bolted or otherwise secured to either side of the saw blade 1 by means such as the bolts 37. The handle 38 is provided with a longitudinally extending rod 39 having thereon a nut 40 and a nut or head 41 at its lower end. The rod 39 extends through the handle 38 and through the block 36 and the nuts 41 and 40 serve to secure said bolt and handle firmly in engagement with the block 36. Secured to the upper and lower faces of the block 36 by means such as the bolts 42, is a pair of guide members or tracks 43—44 having at their outer ends a rectangular frame 45. Mounted to slide longitudinally between the guide members or tracks 43 and 44 is a gear case 46 which preferably although not essentially is formed of a single piece of metal. The gear case 46 has formed therein a bore 47 through which extends a shaft or arbor 48, the inner end of which is provided with a sprocket wheel 49 with which the chain saw is engaged and by which it is operated. The sprocket wheel 49 is fixed between the enlargements 50 and 51 on the shaft 48, the enlargement 50 being preferably integral with the shaft 48 and the enlargement or washer 51 being removably held in position thereon by means such as the nut 52. A plurality of sets of antifriction devices are arranged in the gear case and held in place by the washer 56 and gear wheel 58, being separated by an element 55. Fixed on the outer end of the shaft 48 is a bevel gear wheel 57 having a hub 58. The bevel gear 57 is operated by means of a bevel gear 59 operated by a flexible shaft or other operating device 60 secured to the gear 59 by means such as the set screw 61 extending through the collar 62 of the bevel gear 59. The shaft 60 is suitably journaled in the gear case 46 and is surrounded by a plurality of sets of antifriction devices 63 and 64 on opposite sides of the bevel gear 59. The gear case 46 is normally held at the limit of its movement in the right hand direction in Figs. 1 and 4 by means such as the coil spring 65 which at its outer end surrounds a boss 66 upon the gear case and at its inner end is fitted into a threaded opening or bore 67 formed in the block 36. The tension of the spring 65 is regulated by means of a threaded plug 68 which is fitted into the bore 67 and is provided with an angular opening 69 to receive any suitable tool for rotating the threaded plug so as to adjust the tension of the spring.

The operation of the device is as follows: Power is applied to the shaft 60 in any suitable manner and said shaft, through the bevel gear 59, bevel gear 57, shaft 48 and sprocket wheel 49 drives the chain 10—11—12, or 6—7—8.

Whenever it is desired to remove the chain edge of the saw, either on account of bent, broken or dull teeth, or for any other purpose, it is only necessary to move the gear case 46 toward the block 36, by releasing the tension of the spring 65 a sufficient distance to disengage the sprocket 49 from the chain edge, and said chain edge can then be entirely detached without detaching, altering or changing any other part of the saw structure.

In devices of this character, the end portions of the chain edge of the saw are usually surrounded by tension mechanism or brackets, which it is necessary to detach before the saw edge can be taken off of the saw. In the present construction the edge of the saw can be detached and replaced with the greatest ease.

The chain saw of the present invention is strong, simple, durable and inexpensive in construction as well as thoroughly efficient and practical in operation.

What is claimed as new is:—

1. A chain saw machine having a chain edge, a block at one end thereof, guides extending from the block, a gear case movable between the guides, a spring interposed between the block and the gear case, mechanism carried by the gear case for operating the chain edge, and means for adjusting the tension of the spring.

2. A chain saw machine having a chain edge, a block mounted at one end of the saw blade and having guide members connected therewith, a gear case slidable between said guide members, operating mechanism mounted within said gear case, a sprocket wheel connected with said operating mechanism for driving the saw edge, a spring interposed between said gear case and said block, and a screw plug mounted in said block for changing the tension of said spring.

In testimony that I claim the foregoing as my own, I have hereto affixed my signature in the presence of two witnesses.

BERTON L. BAILEY.

Witnesses:
W. H. FEAR,
O. C. BORTZMEYER.